G. A. ROCKOLA.
PUMP.
APPLICATION FILED OCT. 26, 1907.
909,676.
Patented Jan. 12, 1909.
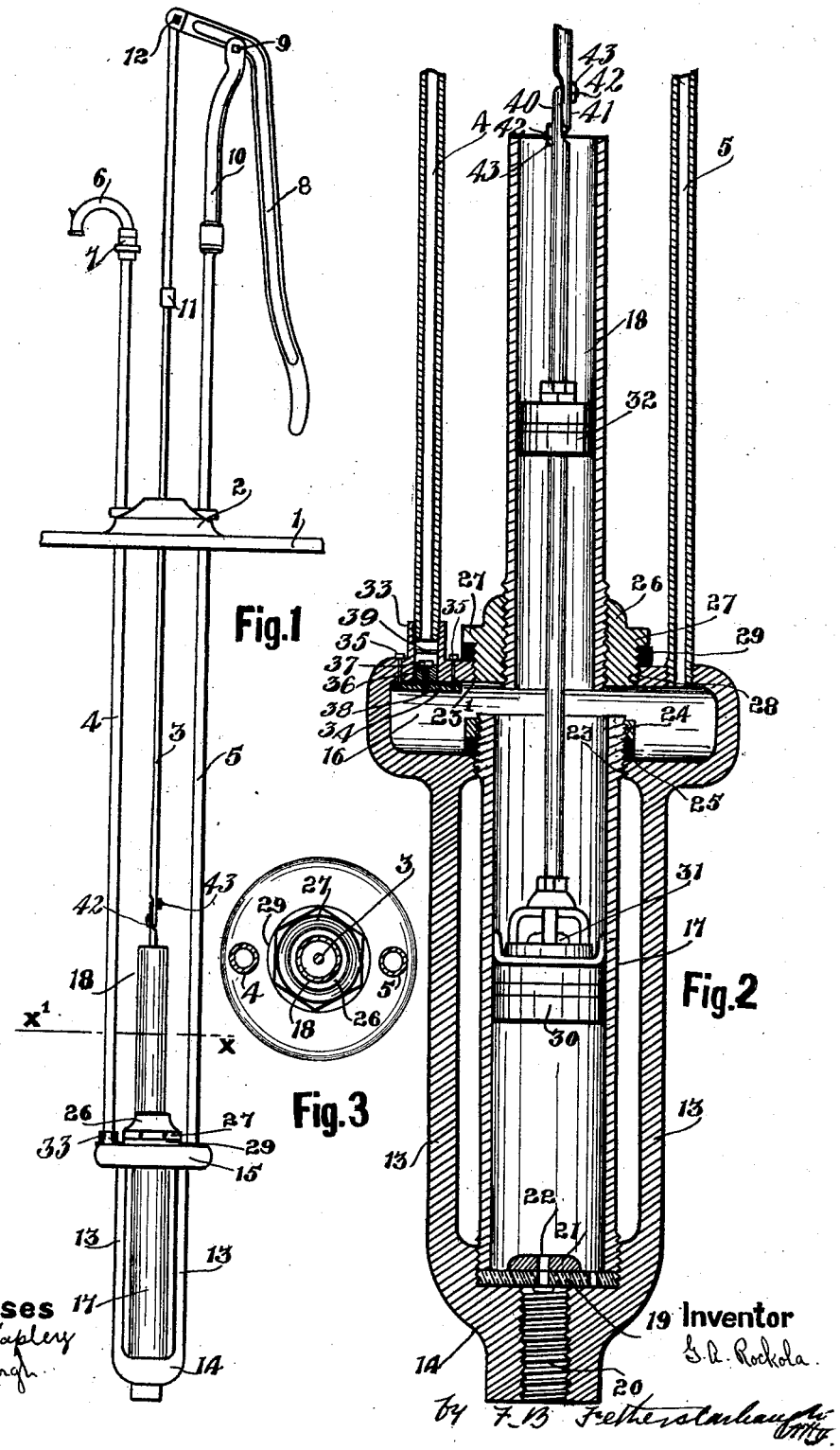

UNITED STATES PATENT OFFICE.

GEORGE ADAM ROCKOLA, OF BIRTLE, MANITOBA, CANADA.

PUMP.

No. 909,676.  Specification of Letters Patent.  Patented Jan. 12, 1909.

Application filed October 26, 1907. Serial No. 399,365.

*To all whom it may concern:*

Be it known that I, GEORGE ADAM ROCKOLA, of the village of Birtle, in the Province of Manitoba, Canada, have invented certain new and useful Improvements in Pumps, of which the following is the specification.

My invention relates to pumps, more particularly, double acting force pumps, and the object of the invention is to design a pump which will allow all the working parts to be removed for repair, without having to take the complete pump from the well, and it consists in certain novel features in construction, and arrangement of parts, as hereinafter more particularly described.

Figure 1 is a side elevation of my complete pump, fitted to a supporting platform. Fig. 2 is a vertical cross section through the pump cylinders, the section passing through both the water and the air pipes. Fig. 3 is an enlarged plan view looking downwardly on the pump cylinders at a section taken along the line X X', Fig. 1.

In the drawings like characters of reference indicate corresponding parts in each figure.

1 is any suitable support and 2 is the pump base. 3 is the plunger or bucket rod, 4 the water pipe, and 5 the air pipe, the latter two pipes being held in the base in any suitable manner. 6 is the spout connected to the upper end of the water pipe by a union 7, so that it may be turned in any desired direction for delivery. 8 is the pump handle pivoted at 9 to an arm 10 extending from the upper end of the air pipe. 11 is a union, connected in the plunger rod, the upper end of such rod being bolted at 12 to the end of the handle. All these members are practically of the same form as those already used, the only change being in the relative position of the rod and the air and water pipes, the reason for which will shortly be divulged.

13 are vertical arms connecting the base 14 with the head 15, such head being somewhat enlarged to form a water chamber 16.

17 is the lower cylinder, and 18 the upper, both being of any approved type, the upper cylinder being of less diameter than the lower.

19 is a valve operating above the channel 20, bored in the base 14.

21 is the ordinary weight on the upper side of the valve, which is held to the valve by a bolt 22.

The cylinder 17 is threaded at its lower end there being a receiving thread formed in the base 14. The lower inner face of the water chamber has a circular opening at 23 large enough to admit freely the cylinder 17. When the cylinder is in place it is screwed to the base 14, the end of it fitting over and holding in the valve, and the upper end is secured by a nut 24 screwing on the end, there being a packing washer 25 between the nut and the inner lower face of the water chamber. The upper face of the water chamber has a circular opening 23' therethrough, sufficiently large to enable the nut 24 to be put in place.

26 is an especially constructed nut connecting the upper cylinder with the head 15. The cylinder has its lower end threaded, and the nut is internally threaded to receive the cylinder. The nut has a flange 27 formed thereon and has also an external thread 28 beneath the flange, which is designed to screw into a receiving thread formed in the opening 23'.

29 is a packing washer, between the flange on the nut, and the upper face of the water chamber.

30 is the lower plunger or bucket carried at the end of the rod 3, and 31 is a valve of the ordinary form, in the plunger.

32 is the upper plunger or bucket carried on the same rod as the lower plunger, and operating in the upper cylinder, there being no valve in this bucket. The air pipe 5 screws directly into the head 15, and opens directly into the water chamber. The water pipe 4 screws directly into the short pipe 33, extending from the face of the chamber 16, and communicating with the chamber.

34 is a plate fitting against the upper inner face of the chamber, directly beneath the pipe 4, being held to the head by screws 35, passing from the outside of the head into the plate. The plate has an inwardly projecting portion forming a valve seat 36 for the valve 37, the stem 38 of which is substantially Y-shaped in cross section.

39 is a spider in the pipe 33, above the valve, and is simply to prevent the valve when open from passing up against the lower end of the pipe 4. The spider is of any design which will allow the passage of water through or past it. In order to insure a tight fit any suitable packing material can be placed between the plate 34 and the upper inner face of the chamber.

The plunger rod 3 has a second joint in it, toward the lower end, slightly above the plunger 32, in order to facilitate in taking the pump apart. This joint is formed by cutting the rod and flattening the two ends at 40 and 41, and through each boring a hole to receive the turned portion 42 of the extreme end of the respective rods, which portion is threaded to receive a nut 43.

I have not given a detailed description of the plunger or the valves, nor of the general operation of the pump in forcing water, as its action is the same as other pumps now on the market, and it is considered unnecessary.

I have found that in all the pumps which have come under my notice of this class that when any repair is required it is invariably necessary to take the complete pump from the well, and then in many cases have an experienced man come and take it apart to make the repair. To give a design of pump which will make this unnecessary is wherein my improvement lies, and to more thoroughly understand it I will now describe how the pump may be taken apart, it being understood that in nearly all cases the principal trouble is generally in the buckets or the valves. The upper cylinder can be removed by unscrewing it from the nut 26, and if the nut 26 be unscrewed and removed ready access is had to the inner nut 24. By unscrewing the nut 24 the lower cylinder can be unscrewed from the base 14 and lifted completely out through the upper openings 23′, and when the cylinder is removed the valve 19 is exposed. The plunger rod can be taken apart at the joint above the plunger 32, and the plunger can be removed as soon as the nut 26 is unscrewed and lifted. It will readily be understood what an important feature it is to have the air and water pipes to the side and absolutely free of the removable parts, and this accounts for the form of the water chamber at the top. It will be understood that right and left hand screws may be used where it is deemed advisable, in order that the various parts may be unscrewed without unscrewing other parts.

The value of the valve 37 is simply to prevent the water from returning to the chamber 16 after it has been forced into the pipe 4, and this will be readily understood, as the valve will admit water from the chamber to the pipe, but is closed by water passing in the reversed direction.

What I claim as my invention is:

1. In a pump the combination with the upper and lower cylinders, and the air and water pipes, of a support for the cylinders and the pipes, the said support consisting in a lower base, and an upper head interconnected by side arms, the base being threaded to receive the threaded end of the lower cylinder, and the head being in the form of a water chamber, there being an opening in the lower face of the chamber to allow the passage of the lower cylinder; a threaded opening through the upper face of the chamber of greater dimension than the lower opening and threaded openings to receive the threaded ends of the pipes; a nut and a packing washer secured on the upper end of the lower cylinder and bearing on the inner lower face of the chamber; a nut carrying a flange and adapted to screw into the threaded opening in the upper face of the chamber, the said nut being internally threaded to receive the threaded end of the upper cylinder, a packing washer between the nut and the upper face of the chamber, the said pipes communicating directly with the water chamber, as and for the purpose specified.

2. In a pump, a base casting comprising a lower portion having a central vertical bore therein, arms, extending vertically from such lower portion, a water chamber supported on the said arms and having internally threaded central orifices extending through the upper and the lower walls thereof, and orifices extending through the upper wall to each side of the central orifice, as and for the purpose specified.

Signed at Birtle, in the Province of Manitoba, this 17th day of September, 1907.

GEORGE ADAM ROCKOLA.

Witnesses:
W. A. W. HAMES,
W. W. W. CULSERE.